(12) United States Patent
Schull

(10) Patent No.: US 6,266,654 B1
(45) Date of Patent: *Jul. 24, 2001

(54) METHOD FOR TRACKING SOFTWARE LINEAGE

(75) Inventor: Jonathan Schull, Rochester, NY (US)

(73) Assignee: Softlock.com, Inc., Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/631,411

(22) Filed: Apr. 12, 1996

Related U.S. Application Data

(63) Continuation-in-part of application No. 07/990,455, filed on Dec. 15, 1992, now Pat. No. 5,509,070.

(51) Int. Cl.[7] .............................. G06F 17/60; H04K 1/00; H04L 9/00
(52) U.S. Cl. ................................. 705/58; 705/59; 705/51
(58) Field of Search .................................. 380/4, 23, 25; 705/57, 58, 51, 59

(56) References Cited

U.S. PATENT DOCUMENTS

| | | | |
|---|---|---|---|
| 4,924,378 | * | 5/1990 | Hershey et al. .......................... 380/4 |
| 5,287,407 | * | 2/1994 | Holmes ................................... 380/4 |
| 5,287,408 | * | 2/1994 | Samson .................................... 380/4 |
| 5,337,360 | * | 8/1994 | Fischer ................................... 380/23 |
| 5,509,070 | * | 4/1996 | Schull .................................... 380/4 |
| 5,530,752 | * | 6/1996 | Rubin ..................................... 380/4 |
| 5,568,550 | * | 10/1996 | Ur ........................................ 380/4 |
| 5,649,013 | * | 7/1997 | Stuckey et al. ........................ 705/58 |
| 5,689,559 | * | 11/1997 | Park ...................................... 380/4 |
| 5,699,434 | * | 12/1997 | Hogan .................................... 380/4 |
| 5,719,937 | * | 2/1998 | Warren et al. .......................... 380/4 |
| 5,745,686 | * | 4/1998 | Saito et al. ............................. 380/4 |
| 5,754,864 | * | 5/1998 | Hill ..................................... 395/712 |
| 5,790,664 | * | 8/1998 | Coley et al. ............................ 380/4 |

FOREIGN PATENT DOCUMENTS

| | | | | |
|---|---|---|---|---|
| JP405257656A | * | 10/1993 | (JP) ........................................ 712/1 |
| 409054735A | * | 2/1997 | (JP) ................................ G06F/13/00 |

OTHER PUBLICATIONS

Softlock.com News Release, SoftLock.com signs document Network Inc. as First Reseller, www.softlock.com, Feb. 1999.*

Internet Software Tracking Service, www.netrecoverysolutions.com/software.html, Oct. 10, 2000.*

* cited by examiner

Primary Examiner—Gail Hayes
Assistant Examiner—Bryan Latham
(74) Attorney, Agent, or Firm—McGuireWoods LLP

(57) ABSTRACT

Software lineages arise through purchase and reproduction. Lineages are tracked by storing lineage-relevant information in variable regions of software instances and/or in a central database according to methods disclosed.

29 Claims, 1 Drawing Sheet

METHOD FOR TRACKING SOFTWARE LINEAGE

This is a continuation-in-part of patent application Ser. No. 07/990,455 filed Dec. 15, 1992 "Method of encouraging purchase of executable and non-executable software" now U.S. Pat. No. 5,509,070, incorporated herein by reference.

BACKGROUND

1. Field of the Invention

We disclose a system whereby software piracy can be deterred while copying and purchasing can be encouraged. User to user copying plays an important positive role in the present system, and in the shareware industry, and as "piracy" it plays an important negative role in other shareware- and internet-based marketing schemes. The present invention discloses methods whereby software copying and purchasing can be tracked, studied, and rewarded, and methods whereby software lineages can become adapted to their environments.

2. Introduction

In an increasingly wired world, software can be reproduced and distributed worldwide, in minutes, and at little cost. For intellectual property vendors, these economies are problematic: freely copyable software typically gives customers little incentive for payment, and it positions piracy as the path of least resistance.

We disclose here a method for piracy prevention and purchase encouragement without loss of copyablility. The system gives vendors round-the-clock and round-the-globe vending and fulfillment services, as well as secondary and tertiary sales from copied software. And the system gives users convenient access to digital products which might otherwise be less readily available, lets them try before buying, provides incentives for purchasing, and rewards them with increased benefits minutes after they decide to buy.

As disclosed, the basic idea is to "lock" selected features of a digital product such that the password required to access those features is unique to a particular product and context, and such that the password can be instantly and conveniently purchased and acquired by telephone, email, modem, etc. Users can thus evaluate locked products in their still-locked "demo mode" and unlock them in minutes. Vendors can encourage customers to pass copies on to other potential customers, because when the context changes, SoftLocked products automatically revert to demo mode.

Using this system, intellectual property owners can allow their products to be freely redistributed without losing control over their conditions of use, and without foregoing the ability to demand and receive fair compensation.

The Importance of Reproduction.

The dynamics, "flow," and reproduction of software through the information marketplace is not well understood, in part because it is difficult to study. Yet it is of significant economic and scientific importance. User-to-user copying, software reproduction, "Pass-along", etc., plays an important positive role in our system, and in other shareware- and internet-based marketing schemes. Unauthorized software reproduction ("piracy") costs software producers billions of dollars annually, and discourages the release of other digital properties. More generally, social scientists have long recognized that the spread and evolution of reproducible patterns of information (variously known as "memes", "culturgens", etc.) is the very essence of culture and cultural evolution. The internet is a recent and arguably revolutionary new arena in which such processes occur with unprecedented speed; methods for investigating and exploiting this new information ecology are therefore sorely needed.

Software marketing, and the study of the information economy would also be greatly enhanced by a system which tracked the flow of copies from person to person and from computer to computer. The ability to track "chains of copying" would aid the investigation of suspected piracy, the study of data flow through unregulated and/or unmonitored digital systems, the auditing of service providers, the exploration of marketing and advertising strategies, and the implementation of multi-level marketing schemes which pay commissions to individuals whose copying and distribution efforts result in increased sales, etc.

It is not difficult to imagine that a piece of software could track its own "travels" from person to person and from computer to computer, for as used here "software" refers either to executable programs into which self-tracking algorithms and technologies might be embedded, or data documents designed for processing by an executable programs, into which self-tracking algorithms and technologies might be embedded.

The present invention discloses a number of suitable self-tracking algorithms and technologies by which one might determine of a product's "chain of copying," "lineage", or "pedigree" within and between processing devices and information networks.

As implied by the terms "lineage" and "pedigree", the reproduction and distribution of software in information networks is similar to the reproduction and spread of organisms in nature. "Computer viruses" are so-called precisely because of this similarity. The present invention exploits and extends this similarity. As will be disclosed below, it solves the problem of tracking, allows digital products to more fully exploit the "darwinian" potential of the information marketplace, and has other applications. To lay the groundwork, some basic concepts of biological systems will now be reviewed.

At a certain level of abstraction, biological reproduction is digital copying: the genetic code is in fact a digital system, and gene pools, species, and ecosystems are in fact highly-evolved networks which support the copying and spread of these codes. In biological parlance, the "genome" is the encoding of a single organism's complete genetic makeup. Although genome sizes vary widely from one species to the next, genome size is virtually constant within a given species. In sexually reproducing species, each parent contributes a random half-genome which is recombined to produce the offspring's complete genome. In asexually reproducing organisms, there is no systematic randomization, and a single parent's entire genome is simply replicated in the offspring, albeit with copying errors known as mutations. In both sexual and asexual species, the size of the offspring's genome is therefore the same size as the parents' genome. In both cases too, the content of the offspring's genome (that is, the particular genetic patterns which characterize the individual) is the same as the parents' content except for the randomizing influences of recombination and and/or mutation.

The copying of artificial digital products is most like asexual reproduction insofar as each instance of a program or document (henceforth "software-instance") can be copied, and each copy can itself become the basis for a "chain of copying" analogous to a biological lineage. Random variation through copying error is usually guarded against in the world of software, but it can occur, and it can certainly be designed into artificial system, as disclosed here.

In biology, random genetic variation plays a crucial role in evolution by natural selection, because it produces functional variations in organisms which are transmitted to offspring. These functional variations have influences on success and biological reproduction, which therefore produces differential reproduction of selected genetic variations, which produces adaptive evolution of species, lineages, etc. Similar processes of variation and selection occur in other systems, and are an increasingly important area of research in theoretical and applied computer science. The relevant disciplines are known as "Artificial Life", "Evolutionary Programming", "Genetic Algorithms", "General Evolution Theory", etc.

Through the study of the genetic sequences in individual genome, biologists have determined that random variation occurs each time reproduction occurs, and that these variations propagate and accumulate though successive generations. By comparing the sequences in one individual with sequences found in other individuals, it is possible to deduce and reconstruct the historical sequence of copying errors which derived those sequences from a common ancestor. The procedures involved are amply documented and widely employed in the scientific literature, so we will only summarize some basic heuristics here.

The degree of similarity between two individuals can be used as an index of the number of copying events which intervene between them. For example, since only one copying event intervenes between parent and offspring, there will be relatively little variation between them, whereas the genomes of more distant relatives tend to be less similar, because many copying events intervene between them. With further assumptions about mutation rate one can estimate the precise number of copying events intervening between two individuals based upon use the degree of genetic dissimilarity between them.

Moreover, because genes can be distinguished by their position within a genome, analysis of the specific patterns of information shared by two individuals provides further clues to the ancestry, or copying history, of those patterns. When an unusual (or less than universal) genetic sequence shows up in two individuals in the same genomic location, it is probable that those individuals share a common ancestor, and that that ancestor bore the same trait. In this way, the genome of the common ancestor can be determined probabilistically.

Finally, by correlating this information with knowledge of confirmed individuals, and through other means, it is possible to reconstruct with a high degree of probability the historical sequence of copying errors which intervened between individuals with similar, but non-identical genomes. The genetic history of a lineage can thus be reconstructed.

Those familiar with biology and biotechnology will know that through methods of the sort sketched above, and through other techniques with similar bases in biology and mathematics, it is possible to reconstruct biological pedigrees with a high degree of accuracy based on very limited samples of populations. The techniques work even though genome size remains constant, and even though the genomes do not contain a systematic record of their own pedigrees.

Although these biological techniques have been developed for the analysis of relatively "messy" biological systems, they can be applied to any system in which idiosyncratic patterns of information accumulate within a reproducing lineage.

We disclose several methods of achieving these ends, and disclose further methods which eliminate the need for retrieval of complete software-instances from the field. Another elaboration will couple the random error mechanism with a mechanism of selection in order to increase the fitness of products to their environment, the usefulness of products to their customers, and the profitability of these products to their creators. Finally, a last elaboration will allow vendors to use the information gathered in order to modify the characteristics of already-released software.

Objects of the Present Invention

One object of the present invention is to provide methods for the tracking of a product's "chain of copying," "lineage", or "pedigree".

Another object of the present invention is to provide a means of rewarding people who redistribute and promote the sale of software Another object of the present invention is to increase the similarity between software lineages and biological lineages in order to increase the applicability of certain analytical techniques developed in biology.

Another object of the present invention is to provide a means by which software lineages can adapt automatically to the environments and markets within which they circulate.

Another object of the present invention is to make the evolution of valuable software less dependent upon human oversight and more sensitive to requirements of local niches and markets.

Another object of the present invention is to extend the existing research disciplines of biology, artificial life, and evolutionary computing to the world of information commerce.

Other objects and applications of the present invention will become apparent from the description and discussion which follows.

SUMMARY OF THE INVENTION

Appendation-based Embodiments

Figure 1:
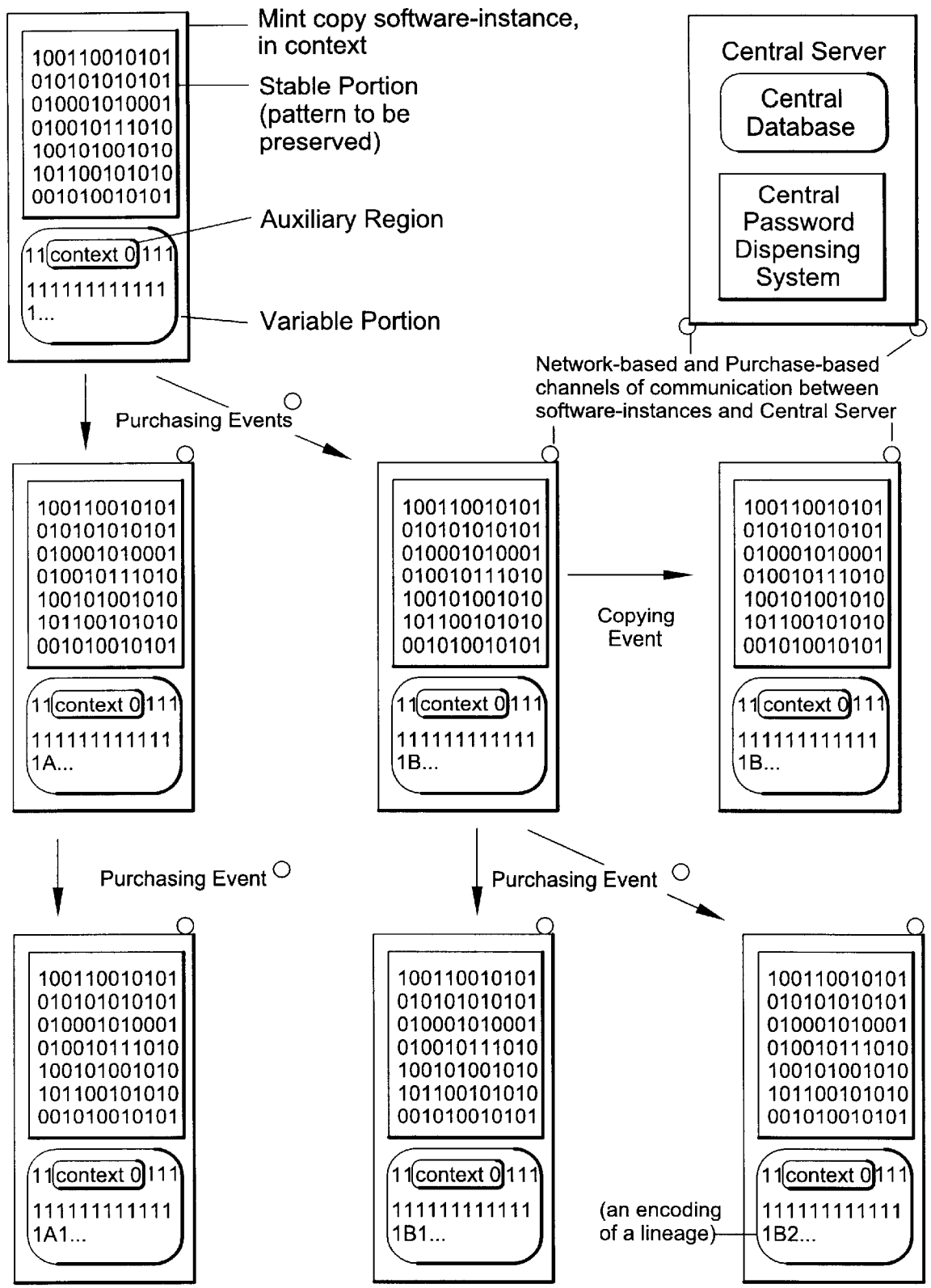
FIG. 1 shows a diagram of a method for tracking software lineage.

FIG. 1. Shows a "mint copy" of a software-instance such as a computer program or document as initially produced by the software manufacturer. The digital product is subdivided into two portions. The "Stable Portion" of the program contains the highly specific instructions or data which cause the computing device to function as desired by programmer and customer. The "Variable Portion" of the program contains a pattern which can change without significantly affecting the product's basic functioning. In the mint copy, the bits in the Variable Portion may be pre-set to a known pattern (e.g., all Is).

Under certain circumstances of interest the pattern in the Variable Portion is made to change or "mutate" in the field. In one preferred embodiment, one such circumstance is the purchase and unlocking of a product's advanced features, and that will be an example used repeatedly in this application. It should be understood, however that the moment of product unlocking is only one example of a circumstance to which mutation could be linked under the present invention. Other circumstances which might be interesting for commercial or research purposes are instances of program-activation, instances of copying, and so on. These disclosures thus apply generally to the storage and/or retrieval of lineage-relevant information in Variable Portions of executable programs or digital document, and the methods whereby this information can be used for commerce, research, etc.

Under the present invention, the change in the Variable Portion should be "idiosyncratic", i.e., the change undergone by two identical software-instances should tend to be distinguishably different, such that the two instances, and their descendants through copying, are distinguishable. It is also important that in the history of a lineage, these changes should accumulate rather than overwrite each other, so the historical sequence of changes can be reconstructed. These requirements can be achieved in many ways, some of which will be disclosed below.

One method of tracking copies utilizing this kind of idiosyncratic information might be called the "Appended History Method": each time a product is purchased, append to the Variable Portion information about the current context, user, etc. To determine the chain of copying through which a product had passed, retrieve copies of the product from the field, and read the "lineage" of each copy from the cumulative list appended to the product. There are problems with the Appended History Method: (1) potentially confidential customer information would be routinely put in the hands of strangers, (2) the product would soon grow impracticably large as more and more information was appended to it, and (3) copies would need to be retrieved from the field for analysis.

The methods to be disclosed below reduce and, in conjunction with our co-pending invention eliminate, these problem".

Software is often comprised of one or more "files" consisting of sequences of 1s and 0s encoded in an information-storage medium. These sequences are typically chosen by human designers to influence the operation of a physical computing device in non-arbitrary ways to produce desired effects. For example, a particular sequence of codes can turn a general purpose computer into calculator of square roots, whereas another sequence of codes can make a CD player reproduce the sounds of a symphony. Thus, the sequences in typical digital products are highly non-random, and the devices which copy those sequences are designed to do so with maximal fidelity. However, it is not at all difficult using conventional computing technology, to store modifiable sequences of data in a software product, to cause them to be modified randomly or non-randomly, and to arrange for those modifications to be preserved in derivative copies. FIG. 1 provides an example of one way in which this concept might be realized.

One preferred embodiment improves upon the Appended History Method: instead of appending a history to the product as described earlier, append just the idiosyncratic context fingerprint which is automatically transmitted at purchase-time to the Central Password Dispensing service. The possibility of duplicates is eliminated entirely in another embodiment in which the value to be appended is actually assigned by the Central Password Vending system and transmitted back to the software-instance through the password delivered and/or through another datum transmitted at purchase time.

Still other appendation-based embodiments achieve the same general end: for example, a pseudo-random number can be appended to the Variable Portion of the product each time a "mutation" is desired, and this too will provide a basis for lineage reconstruction. It should thus be understood that the invention can be embodied in many different ways, and that all of these embodiments, including many not mentioned here, fall within the scope of the present invention.

All of the appendation-based embodiments described are superior to the Appended History Method described earlier in that customer information need not be incorporated into the files being copied and redistributed passed on, with the benefits that customer information will not be exposed to the scrutiny of strangers, and that the growth of the Variable Portion will grow much more slowly with each appendation.

Furthermore, if the contents of the Variable Portion are routinely transmitted to the Central Password Dispensing system during purchasing events, either in the fingerprint or as additional data are transmitted, then it will be possible to use the Central Database to translate the meaningless string of appended "mutations" into an information rich sequence of customer-associated purchasing events, again without requiring that the customer information be placed in the Variable Portion itself.

An example based upon one of the aforementioned embodiments will demonstrate the principles involved in many of the embodiments just described. Consider the case in which mutations are assigned and transmitted at purchase-time from the Central System in such a way as to prevent repetition, and that those mutations can be expressed or typecast as ordinal ASCII characters. A Variable Portion retrieved from the field might look like this: AECB, and might under one simple coding scheme be interpreted as follows: the purchase-event which gave rise to this software-instance is the second purchase of a copy of the software-instance known as AEC. AEC is the third descendant of software-instance AE, which was the fifth descendant of the mint copy, instance A. The Central Database would allow one to look up each software-instance and associate it with the customer information acquired at the purchase-event which created that software-instance. Many other coding schemes and scenarios can be envisioned which would be variations on such themes, and additional embodiments of the present invention. But in any case, by analyzing a number of software-instances one could identify the software-instances which had been disseminated or positioned most successfully, and track the customers and/or circumstances responsible for that success.

Data Retrieval

Analysis of sampled genomes is a necessary part of the system just described, and many sampling methods can be envisioned. However, the retrieval of software instances from the field could be both awkward and inefficient. Working with biological materials, field biologists, ecologists and social scientists typically go out into the field, capture and bioassay representative samples, apply statistical and sampling methodologies to the data obtained, and estimate population characteristics, etc. It is often an arduous process. In the "information ecosystems" addressed by the present invention it will often be much easier to retrieve, assay and analyzes samples, and the results may nonetheless shed considerable light on the phenomena of biology and natural selection. Furthermore the ability to address targeted inquiries to Users of particular interest could facilitate research considerably.

Furthermore, as disclosed here, retrieval of the Variable Portion can be an integral and unobtrusive part of the automated purchasing process. Note that only the Variable Portion of the genome must be analyzed, and this will typically be a small fraction of the entire product. Note also that the automated purchasing process often requires that the password dispensing system deliver the customer's password only after receipt of certain information from the customer—e.g., credit card information, personal information, a Product Number, a number which encodes the context in which that product is to be unlocked, etc. Upon receipt of this information, the password vending system (in a typical embodiment) stores the information, debits the customer's credit card, and then generates and transmits the password back to the customer. Many kinds of communication channels can be used to link the customer with the password vending system for this transaction (e.g., touch tone telephone, electronic mail, world wide web browser), and many of them could simultaneously transmit the Variable Portion of the software-instance being purchased at the same with little added delay. In this way, the vending system could collect all of the information needed for the lineage analysis and associate it with customer information which would facilitate commission-payments, correlative analysis of the lineage data, etc. The data for subsequent analysis would thus accumulate conveniently in a central database.

In short, this system would allow sophisticated "ecological" and "genetic" analysis of the reproduction and sale of a digital product in its market/niche, and could do so without storing a large or ever-increasing amount of space to in the products itself. The system would provide valuable information to the vendors of the products, and could be a useful research tool in its own right for scientific studies of "network ecosystems" and for a broader science of information ecology.

Here is an example of one way in which the system might be used. It might well be advantageous to offer purchasers a commission on sales derived from their own purchased copy of a given product. This would encourage users to purchase the product, pass it to other potential purchasers, post it, publicize it, and recommend it on bulletin board systems where it is likely to be discovered or downloaded, and so on. It would also provide a way of offering existing purchasers a discount when they buy second or third copies for use on additional computers. The present system, without modification, already collates all of the information which would be needed to implement this scheme. When Customer A purchases a copy, his name, address etc is collected along with the Variable Portion data which individuates his particular purchased copy. If subsequent purchases involve new genomes which differ from Customer A's genomes by only one bit, they will be recognizable as first-order derivatives of Customer A's copy; if a new genome is registered which differs by two bits, it will be recognizable as a second order derivative, and so on. Commissions could thus be paid to successful redistributors on a regular basis, and under a variety of terms and conditions which might be specified in the promotional language embedded in the product itself. (Ambiguities, if the implementation allows them to arise, would not be fatal, and might even add a lottery-like appeal to the enterprise, if accidental "namesakes" were allowed to share in each others profits. A system like this would not only create a spontaneous cadre of ad hoc sales agents, it would enable help vendors discover new markets and marketing strategies by interviewing successful agents.

Independent of our co-pending invention, we also disclose that in chronically networked environments such as the internet, there are alternative means by which it is possible for software-instances to transmit their Variable Portions and/or other information such as physical location, conditions of use, etc. to the Central Database. Under internet networking protocols it is routine for a program running on one computer to transmit information to a Central Host located virtually anywhere in the world. It is also easy and routine for a program to report the computer, file system and filename ("footprint"), from which it is running, the functions it is executing, etc. To maximize the value of this information it is desirable that each software-instance be distinguishable from other software-instances. Under the present invention, all software-instances derived from a particular "parent" have the same "genome" or identity. Furthermore it is will be disclosed in the next paragraph that the present invention enables even "sibling" software-instances to be distinguishable from each other. Therefore it will be possible for each software-instance to have a unique identity and to report that identity as well as its footprint at the moment of the report to the Central Database under a variety of circumstances, thus providing vast amounts of information to the researcher.

The method by which "siblings" can be made distinguishable from each other is to set aside an auxiliary data region in the Variable Portion which does not mutate under the circumstances heretofore described. The values in this data range must be made relatively unique so that they differentiate siblings, and must be relatively stable so that the software-instance can have a stable identity. One way to achieve this for executable programs is as follows. Whenever a new genotype arises (e.g., when a new mutation is appended to the primary Variable Portion) the Auxiliary Region is cleared, or set to a null value. Whenever a program starts up, it checks to see if it has a non-null value in its Auxiliary Region, and if it does not, it gives itself a random, pseudorandom, or otherwise idiosyncratic value. The effect of this method will be for each software-instance to give itself an idiosyncratic "name" on the first occasion in which it runs. The name will retained until the software-instance undergoes another mutation, at which point it, and any clones which are created from it will again give themselves unique names.

Under this disclosure it will thus be possible in chronically networked environments for every software-instance to send "signed" reports to the Central Database reporting upon their physical location and/or activities.

Those skilled in the arts will recognize that similar methods derived from the co-pending disclosure can be used to achieve the same ends with non-executable document files. In this case, it is an executable program which does the reporting and implements the dynamic activities described, but it operates upon and reports about the status not of its own Variable and Auxiliary Portions, but those of the document being studied. Thus, the scope of this invention goes well beyond the specific embodiments used as examples.

It should also be understood that the Variable Portion of a product need not necessarily be physically distinct from other functioning components of the program. A record of mutation events might also be intermingled with other data objects in the product. Steganographic techniques, for example, could be used to store the data of the Variable Portion within images or other data structures. Thus, the present invention is concerned with the general methodology of adding random values to a random data in a product so as to render those products amenable to lineage-analyses and other phenomena and technologies usually associated with biology.

Non-appendation-based Embodiments

Under an additional disclosure in the next paragraph, non-appendation-based embodiments can alternatively be used to create, accrue and collate lineage information. These methods do not bear the burden of a Variable Portion which grows open-endedly. Rather, the system created is more like that of organisms with fixed-size genome. Under this scheme, as in biology, the inferences one came make are more probabilistic than deterministic. As in biology also, the dynamic of random variation and natural selection in this scheme gives rise to a variety of scientifically interesting, and commercially useful, phenomena.

When mutations are desired, a random or idiosyncratically chosen bit in the Variable Portion is set to its opposite state (0 to 1, or 1 to 0). As a result, copies of this particular program-copy are identifiable by the particular pattern which results. If one of these copies is made to mutate on a further occasion, another randomly selected bit in the Variable Portion will be flipped, and the descendants of that "lineage" will be identifiable by the particular sequence of bits produced by those two random events.

Phrases such as "random or idiosyncratic" should be clarified. As used in biology and in many computer implementations of "random number generators" the term does not necessarily refer to genuinely non-deterministic events. Random number generators for example, often generate pseudorandom numbers by way of deterministic algorithms in essentially error-free hardware. The important point is that "random mutations" in biology "random numbers" in computers and "random errors" in the present invention are idiosyncratic and unpredictable in the context of the data structures to which they are introduced (genome, number stream, or Variable Portion). In the context of the present disclosure, it is important only that when two identical programs are "mutated" the particular bit or bits chosen for flipping will usually differ. Randomness, pseudo- or otherwise, is only one way of achieving this end. Another way, using the technology of our co-pending invention would be to use a fingerprint of the user's computer as a modulus for selecting the bit to be flipped from the range of available bits. Another way, would be to have the Central Database decide which bit to flip, based upon a statistical analysis of all prior cases, so as to minimize ambiguities.

However achieved, random or idiosyncratic mutations in the Variable Portion of a product provide the program with a "genome" which will yield to the kinds of lineage analyses developed in biology, and sketched above. By sampling the genome of individual programs obtained from the "field," it will thus be possible to determine which instances are copies of the originally-distributed mint copy, which instances are copies of "first generation" registered offspring of the mint-copy, and so on. It will be possible to derive pedigrees. By correlating those pedigrees with independent information about the distribution of those pedigrees in space and time. It will be possible to draw inferences about the temporal-spatial niches which favor high rates of purchasing, copying, pedigree-branching, and so on. The methodologies involved were reviewed above, and are well-documented in the literature of biology, ecology, evolutionary systematics, etc.

These inferences are necessarily probabilistic and subject to error, but they are extremely powerful nonetheless. To illustrate one source of error, consider that a particular bit might be selected for flipping on two separate occasions in the history of a particular lineage, and that the two flips could cancel each other out. This weakness can be addressed in a variety of ways. Since the "Variable Portion" of the mint copy can be known, the software which does the bit-flipping could be programmed to avoid this case by selecting randomly among as-yet-unflipped bits only. Even without this fix, however, the resolving power of this system is directly related to the size of the Variable Portion, and substantial resolving power could be achieved with a Variable Portion of only a few thousand bytes. Furthermore, by partitioning the Variable Portion into distinct regions, even greater resolving power can be achieved. For example if the space allocated to the Variable Portion is increased from 1000 to 2000, the chance of such "collisions" is halved. But if the 2000 bit Variable Portion were also partitioned into two regions, with each region undergoing one random mutation per Event, then the chance of a reversal goes from 1 in one thousand to 1 in one million. Other methods of preventing or resolving ambiguities would be to have the Central Database assign or reassign non-unique mutations based while communicating with the software-instance.

Even if ambiguities exist in population of Variable Portions, sophisticated analytical algorithms could resolve such ambiguity by using correlative information such as the time and place from which the copy in question was acquired. Customers could also be queried when such ambiguities are discovered.

It should thus be understood that the system need not be completely reliable in order to be of great utility, that the embodiments just described are only a simple example, and that many variations and improvements can be envisioned which would fall within the scope of the present invention. Natural Selection, Artificial Selection, and Gene Therapy.

Natural selection is the most successful algorithm known for the generation of solutions to problems. Some philosophers of science characterize the algorithm in quite general terms—the differential reproduction of randomly generated successful variations—and assert that it is the only solution-generating algorithm there can be. Be that as it may, we will now disclose a method by which the variations embedded in the Variable Portion of a product can be the basis for a natural-selection-like process which can be directed toward solutions to problems which include, but are not limited to, the maximizing of sales and the tendency to be copied.

Some of the data in the Variable Portion of a product can be made to encode parameters which affect the utility or attractiveness of that product. This is a standard technique in the branch of computer science known as genetic algorithms and evolutionary programming. In the present context, the designer of the product would probably want to constrain the executing program's use of those parameters carefully, so that mutations could not have unacceptable or fatal effects. But even within such constraints, there are many ways this might be done.

Consider the case of a computer program which, if it is operating in demo mode, runs for a certain number of minutes and then requires the user to either make a purchase or restart the program. From the Vendor's point of view, the optimal number of minutes would give the user enough time to evaluate and appreciate the program, but not so much time as to reduce the probability of purchasing. It may be difficult for the software designers to identify the optimal number of minutes, and in fact the optimal value may well depend upon the market in which the product is being distributed. The present invention addresses many such cases in which it would be desirable for digital products to adapt themselves to local circumstances without direct intervention by the designer.

Because the parameter settings are encoded in the Variable Portion of the product, occasional mutations will cause those parameter settings to vary from one software-instance to another in the field. By definition, and by the logic of natural selection, software-instances with parameter settings which are more conducive to copying in a given environment, will tend to be copied more often and will therefore tend be more widely represented in the field. Thus, simply by encoding some functional parameters of the product in the product's Variable Portion, a process very much like natural selection will tend to occur wherever multiple instances of a program tend to proliferate. The adaptive process will be efficient only if the mutation rate is not so high as to degrade the influence of selective factors, and a variety of other possible adjustments and embellishments can readily be gleaned from the extensive literature on genetic algorithms and evolutionary programming. But the foregoing presentation should be sufficient to demonstrate that that literature has been made relevant and applicable by the invention here disclosed.

This invention is scientifically valuable because it extends the theory and technology of selection theory to the field of software distribution, and it is commercially valuable because it provides a means by which products which thrive on copying can automatically adjust themselves so as to promote their own reproduction. It should also be noted that the applicability of the invention is not restricted to products which are meant to be purchased. It is applicable to software whose purpose is the presentation of commercial messages, because the more widely distributed the software is, the more effective it will be. And for similar reasons it is applicable to non-commercial software which is simply more useful when it is ubiquitous, e.g., a "positive computer virus" released by network administrators whose function was to somehow facilitate network traffic. Many other domains of applicability exist as well, and are intended to fall within the scope of the present invention.

However, from the point of view of a Vendor of a product intended for purchase, the invention just disclosed will be most useful insofar as the parameter values which promote copying also promote purchasing. This may not be the case. For example, in the case of the program which waits N minutes before requiring that the user purchase or restart, a high value of N might maximize copying but minimize purchasing. In that case, the natural selection process (which promotes copying, not "goodness") would actually work against the Vendor's true interest. The following paragraph shows how many of the inventions disclosed so far can be used in concert.

If the sampling process is yoked to purchasing events (as has often been posited above for expositional reasons only) than the Central Database will be able to directly monitor purchasing events rather than copying events per se. However we will now disclose (1) a way in which copying events can be monitored directly and (2) a way in which copying events can be monitored. indirectly.

Copying events can be monitored directly as follows, and as illustrated in FIG. 1. Let the product store a trace of its footprint, physical location, or context in an Auxiliary Region of the Variable Portion, and let its footprint be empirically checked dynamically each time the program runs. If the footprint determined empirically differs from the footprint stored in the Auxiliary Region and if no purchasing event has also occurred, then the program has been copied (or moved) from a former location. Record that event in a Central Database, in an auxiliary region, etc. and update the stored footprint value. Such techniques could be elaborated and implemented in a variety of ways all of which fall within the scope of the present invention.

Copying events can be monitored indirectly as follows. Suppose that purchasing events produce mutations, but copying events do not. Lineages whose members tend to promote purchasing rather than copying will tend to be deep rather than wide-fewer copies of an individual will be made, but those which are made will tend to generate descendant variants through purchases. Lineages whose members tend to promote copying more than purchasing will therefore tend to be wide rather than deep-that is, individuals well tend to have more siblings than grandchildren. Thus by identifying lineages which are wide vs deep, and then examining the parameter values associated with these lineages, it would be possible to identify parameter values which promote purchasing as well as copying.

Once those parameters were identified, the vendor who wished to maximize sales could release a new version of the program with fixed rather than Randomizable settings on those parameters which maximize promote purchases. Alternatively, an ancillary invention disclosed in the following paragraph could be employed.

During the purchasing process, a channel of communication is established between the user's program and the vending system. As exploited elsewhere in this invention, the channel is bi-directional. Some information flows from customer to vending system: customer information, context information, and Variable Portion information. Information also flows from vending system to customer: the password and potentially, as disclosed now, other information which could be used to reset or reprogram the software-instance being purchased. Specifically if the Central System identified a software-instance with evolved characteristics known to be at variance with the desires of the vendor, it could be used to transmit Vendor-selected values to the software-instance, and also transmit a code which would protect values from mutation in the future. These settings would then be stably propagated when copies of the program were redistributed. The information transmitted from the vending system to the software-instance could be embedded in the password, or it could be transmitted as a separate piece of information. It could be transmitted with or without the active participation of the customer. Thus the invention disclosed is quite general, and the embodiments described merely illustrate a few of the ways in which the present disclosures might be used in practice. As an example, and as previously noted, it should not be supposed that the purchase-based sampling process is the only one which could be used to allow vendors to set parameters on their products after those products have been released. Network-aware applications of the sort which are now common on the global internet can, in seconds, exchange information with servers located anywhere in the world, and it would therefore be possible for software-instances to get or give information to the Vendor whenever they are executed and not just when they are purchased. The present disclosures thus apply to any method by which information gathered from populations of variant software-instances is used to set parameters in already-released copies of that software.

Summary: Ramifications and Scope

The present invention increases the convergence, relevance and mutual benefit of computer science, evolutionary biology, economics, and software marketing, and software engineering to each other. Many variations on, and permutations of the disclosures herein can be envisioned, and so the examples, embodiments, and specificities above should not be constued as limiting the scope of the invention, but merely providing illustration of the presently preferred embodiments of this invention. For example, the methods disclosed could be applied to copy-instances not usually thought of as software such as music CDs or photocopied materials; mutations might be desirable under occasions of interest such as software execution as well as the occasions of copying and purchasing discussed above; and so on.

Thus the scope of the invention should be determined by the appended claims and their legal equivalents, rather than by the examples given.

What is claimed is:

1. A method of tracking the lineage of software, said method comprising:

providing a software-instance of said software, said software-instance containing a first stable portion containing code for stable functions of the software, and a first variable portion having a first set of lineage-relevant information contained therein, said lineage-relevant information including information relating to a chain of copying events resulting in said software-instance and information relating to at least one of a user-to-user copying event, operation of said software-instance, unlocking of features of said software-instance and a change to operating parameters of said software-instance; and reproducing said software-instance to form a copy of said software-instance, said copy including a second stable portion and a second variable portion having a second set of lineage-relevant information contained therein whereby the lineage of said copy can be ascertained, said second variable portion being configured so that a third set of lineage-relevant information may be stored in said second variable portion responsive to a subsequent lineage-relevant event.

2. The method according to claim 1 wherein said second set of lineage-relevant information includes a fourth set of lineage-relevant information appended to said first set of lineage-relevant information.

3. The method according to claim 1 wherein said first set of lineage-relevant information and said second set of lineage-relevant information are encrypted.

4. The method according to claim 1 further comprising:

transmitting said second set of lineage-relevant information to a central database for storage therein; and replacing said second set of lineage-relevant information in said second variable portion with a set of retrieval information, said retrieval information being adequate for enabling selective retrieval of said second set of lineage-relevant information from said central database.

5. The method according to claim 1 wherein said second set of lineage-relevant information includes data that is readable by said second stable portion and whereby operation of said second stable portion may be altered.

6. The method according to claim 1 wherein said first set of lineage-relevant information and said second set of lineage-relevant information are idiosyncratic.

7. The method according to claim 1 wherein said first and second sets of lineage-relevant information are stored as changes to idiosyncratically selected locations in said first and second variable portions.

8. The method according to claim 7, wherein said changes are assigned by a central database.

9. The method according to claim 7, wherein said first and second variable portions are each partitioned into a plurality of distinct regions and wherein said changes include modification of each said distinct region thereby reducing the size of said first and second variable portions necessary for storage of said first and second sets of lineage-relevant information.

10. The method according to claim 7 wherein said locations are selected at random by said copy of said software-instance.

11. A method of tracking the lineage of copies of software comprising:

providing a software-instance of the software containing a stable portion and a variable portion, said variable portion having a first set of lineage-relevant information contained therein whereby the lineage of said software-instance can be ascertained, wherein said lineage-relevant information includes information relating to a chain of copying events resulting in said software-instance and information relating to at least one of a user-to-user copying event, operation of said software-instance, unlocking of features of said software-instance and a change to operating parameters of said software-instance, said variable portion being configured so that additional lineage-relevant information may be stored in said variable portion responsive to each of a plurality of lineage-relevant events; and modifying said variable portion to include a second set of lineage-relevant information responsive to one of said plurality of lineage-relevant events.

12. The method according to claim 11 wherein said second set of lineage-relevant information includes a third set of lineage-relevant information appended to said first set of lineage-relevant information.

13. The method according to claim 11 wherein said first set of lineage-relevant information and said second set of lineage-relevant information are idiosyncratic.

14. The method according to claim 11 wherein said first set of lineage-relevant information and said second set of lineage-relevant information are encrypted.

15. The method according to claim 11 further comprising:

transmitting said second set of lineage-relevant information to a central database; and replacing said second set of lineage-relevant information in said second variable portion with a set of retrieval information, said retrieval information being adequate for enabling selective retrieval of said second set of lineage-relevant information from said central database.

16. The method according to claim 11 wherein said second set of lineage-relevant information includes data that is readable by said stable portion and whereby operation of said stable portion may be altered.

17. The method according to claim 11 wherein said first and second sets of lineage-relevant information are stored as changes to idiosyncratically selected locations in said variable portion.

18. The method according to claim 17 wherein said locations are selected at random by said copy of said software-instance.

19. The method according to claim 17, wherein said variable portion is partitioned into a plurality of distinct regions and wherein said changes include modification of each said distinct region thereby reducing the size of said variable portion necessary for storage of said first and second sets of idiosyncratic lineage-relevant information.

20. The method according to claim 17, wherein said changes are assigned by a central database.

21. A method of tracking lineage-relevant changes to the operating context of software, said method comprising:

providing software containing a stable portion and a variable portion, said variable portion having a set of lineage-relevant information contained therein;

operating said software in a first context having a first set of identification characteristics;

storing in said variable portion a first set of identification information derived from said first context;

operating said software in a second context having a second set of identification characteristics, wherein said second context may be the same as said first context;

retrieving said first set of identification information to enable comparison of said first set of identification characteristics to said second set of identification characteristics;

comparing said first set of identification characteristics to said second set of identification characteristics to identify lineage-relevant differences between said first and second sets of identification characteristics;

modifying said lineage-relevant information to include information derived from said lineage-relevant differences between said second set of identification characteristics and said first set of identification characteristics responsive to identification of differences between said first and second sets of identification characteristics; and storing in said variable portion a second set of identification information derived from said second set of identification characteristics.

22. A method of tracking software lineage comprising:

providing a plurality of software-instances, each said software-instance containing a stable portion and a variable portion wherein information stored in said variable portion is readable by said stable portion, said variable portion having a first set of lineage-relevant information contained therein whereby the lineage of said software-instance can be ascertained, wherein said lineage-relevant information includes information relating to a chain of copying events resulting in said software-instance and information relating to at least one of a user-to-user copying event, operation of said software-instance, unlocking of features of said software-instance and a change to operating parameters of said software-instance, said variable portion being configured so that additional lineage-relevant information may be stored in said variable portion responsive to each of a plurality of lineage-relevant events;

transmitting said first set of lineage-relevant information from at least one of said plurality of software-instances to a central server;

determining desirable changes to operational characteristics of said plurality of software-instances based on said lineage-relevant information received from said at least one of said plurality of software-instances;

transmitting a second set of lineage-relevant information to at least one of said plurality of software-instances for storage within said variable portion of said at least one of said plurality of software-instances, whereby operation of said stable portion of said at least one of said plurality of software-instances may be changed.

23. The method according to claim 22 wherein said second set of lineage relevant information is transmitted from said central server to said software-instance during a purchasing event.

24. The method according to claim 22 wherein said second set of lineage relevant information is transmitted from said central server to said software-instance through network-based channels of communication.

25. The method according to claim 22 wherein said first set of lineage-relevant information and said second set of lineage-relevant information are idiosyncratic.

26. A method of tracking the lineage of a software-instance of software, said method comprising:

providing a plurality of software-instances each having a lineage comprising at least one lineage-relevant event and containing a first stable portion containing code for stable functions of the software, and a first variable portion containing lineage-relevant information stored as a plurality of bits, at least one of said bits having been selected at random and its state changed responsive to each lineage-relevant event in said lineage, wherein said lineage-relevant information includes information relating to at least one of a copying event, operation of said software-instance, unlocking of features of said software-instance and a change to operating parameters of said software-instance;

selecting at random at least one bit in said first variable portion in response to a lineage relevant event, said at least one bit having a particular state; and changing the state of said randomly selected at least one bit, thereby adding to said lineage relevant information.

27. A method according to claim 26 further comprising the steps of transmitting said lineage-relevant information from each of at least a portion of said plurality of software-instances to a central database;

performing a statistical analysis of said lineage-relevant information from all of said at least a portion of said plurality of software-instances; and determining probabilistic inferences regarding the lineage of one of said at least a portion of said plurality of software-instances.

28. A method of tracking the lineage of a software-instance of software, said method comprising:

providing a plurality of software-instances each having a lineage comprising at least one lineage-relevant event and containing a first stable portion containing code for stable functions of the software, and a first variable portion containing lineage-relevant information stored as a plurality of bits, at least one of said bits having been selected at random and its state changed responsive to each lineage-relevant event in said lineage, wherein said lineage-relevant information includes information relating to at least one of a copying event, operation of said software-instance, unlocking of features of said software-instance and a change to operating parameters of said software-instance;

reproducing one of said plurality of software-instances to form a copy of said software-instance, said copy including a second stable portion and a second variable portion containing said lineage-relevant information;

selecting at random at least one bit in said second variable portion, each of said at least one bit having a state equal to a corresponding bit in said first variable portion; and changing the state of said randomly selected at least one bit, thereby adding to said lineage relevant information contained in said second variable portion.

29. A method according to claim 28 further comprising the steps of:

transmitting said lineage-relevant information from each of at least a portion of said plurality of software-instances to a central database;

performing a statistical analysis of said lineage-relevant information from all of said at least a portion of said plurality of software-instances; and determining probabilistic inferences regarding the lineage of one of said at least a portion of said plurality of software-instances.

* * * * *